United States Patent
Shahid

(10) Patent No.: US 6,364,539 B1
(45) Date of Patent: Apr. 2, 2002

(54) STACKABLE MULTI-FIBER FERRULES HAVING IMPROVED INTERCONNECTION DENSITY

(75) Inventor: Muhammed A. Shahid, Snellville, GA (US)

(73) Assignee: Avaya Technology Corp., Basking Ridge, NJ (US)

( * ) Notice: Subject to any disclaimer, the term of this patent is extended or adjusted under 35 U.S.C. 154(b) by 0 days.

(21) Appl. No.: 09/262,107

(22) Filed: Mar. 4, 1999

(51) Int. Cl.⁷ .............................. G02B 6/38; G02B 6/36
(52) U.S. Cl. ............................................ 385/83; 385/65
(58) Field of Search ..................... 385/51, 59, 65, 385/71, 75, 76, 88, 85, 83, 64, 82, 97, 98, 134

(56) References Cited

U.S. PATENT DOCUMENTS

| | | | |
|---|---|---|---|
| 3,864,018 A | * | 2/1975 | Miller .......................... 385/98 |
| 4,046,454 A | * | 9/1977 | Pugh, III ...................... 385/59 |
| 4,973,127 A | | 11/1990 | Cannon, Jr. et al. |
| 5,044,711 A | * | 9/1991 | Saito ........................... 385/83 |
| 5,082,346 A | * | 1/1992 | Myers .......................... 385/54 |
| 5,379,361 A | * | 1/1995 | Maekawa et al. ............. 385/59 |
| 5,388,174 A | | 2/1995 | Roll et al. |
| 5,396,572 A | | 3/1995 | Bradley et al. |
| 5,481,634 A | | 1/1996 | Anderson et al. |
| 5,603,870 A | | 2/1997 | Roll et al. |
| 5,613,024 A | | 3/1997 | Shahid |
| 5,620,634 A | | 4/1997 | Shahid |
| 5,666,456 A | | 9/1997 | Merriken |
| 5,689,599 A | | 11/1997 | Shahid |
| 5,768,455 A | | 6/1998 | Konik |

FOREIGN PATENT DOCUMENTS

EP    0 490 698 A1    6/1992

OTHER PUBLICATIONS

Roger E. Weiss, *Multifiber–ferrule ribbon cable connector shrinks installation costs*, Oct. 1996 edition of *Lightwave*, Copyright 1996 by Penn Well Publishing Company.
Focis 12; Fiber Optic Connector Intermateability Standard.

* cited by examiner

Primary Examiner—Cassandra Spyrou
Assistant Examiner—Jared Treas

(57) ABSTRACT

A stackable multi-fiber ferrule of the present invention enables relatively tighter stacking between fiber arrays, resulting in increased interconnection density. The present invention achieves tighter stacking by incorporating an inner support member having alignment pin grooves on only one side, thereby permitting the thickness of the support member to be reduced. Thus, the thickness of the inner support member may be thinner than that of conventional support members because the inner support member of the present invention does not have to accommodate opposing alignment pin grooves on both sides thereof. Thus, a multi-fiber stackable ferrule in accordance with the present invention will have alignment pin holes on alternating rows of fibers, that is, on every other interface between adjacent support members. Accordingly, a stackable multi-fiber ferrule in accordance with the present invention is capable of improved interconnection density.

24 Claims, 3 Drawing Sheets

STACKABLE MULTI-FIBER FERRULES HAVING IMPROVED INTERCONNECTION DENSITY

FIELD OF THE INVENTION

The present invention generally relates to optical fiber connectors, more particularly, to stackable ferrules for terminating optical fiber ribbons.

BACKGROUND OF THE INVENTION

Advances in lightwave technology have made optical fiber a very popular medium for large bandwidth applications. In particular, optical technology is being utilized more and more in broadband systems wherein communications between systems take place on high-speed optical channels. As this trend continues to gain more and more momentum, the need for efficient utilization of the precious real estate on circuit boards, racks/shelves, back planes, distribution cabinets, etc., is becoming ever increasingly important. In order to fulfill expectations across the industry, opto-electronic modules and optic fiber devices need to continue to become miniaturized, thereby taking full advantage of the maturity of micro- and opto-electronic technologies for generating, transporting, managing and delivering broadband services to the ever increasing bandwidth demands of end users at increasingly lower costs. Thus, the industry has placed an emphasis on small form factor optical connectors, such as the LC connector from Lucent Technologies, Inc. However, miniaturization is tempered by the requirements of transmission efficiency. For instance, with the advent of new standards such as gigabit ethernet, wherein the transmission efficiency is becoming more and more critical, the performance of optical connectors is becoming correspondingly important for healthy operation of the system. Thus, it is desirable to obtain component miniaturization without sacrificing transmission efficiency, and sometimes while improving transmission efficiency.

With the miniaturization of optical modules and optical fiber devices, the management of optical fiber congestion has become an issue at optical interfaces and connection distribution points. One solution is the use of multi-fiber ribbon in which a plurality of optical fibers are organized and molded side by side in a plastic ribbon. It is known to interconnect these ribbon cables by supporting the fibers between two support members made of a monocrystalline material, such as silicon. In the support members are V-grooves formed utilizing photolithographic masking and etching techniques. The fibers are placed side by side in individual V-grooves of one support member and the other mating support member having corresponding V-grooves is placed over the fibers so as to bind or hold the fibers in a high precision, spatial relationship between the mating V-grooves. The top and bottom support members sandwiching the multi-fiber ribbon are typically bonded together with a clamp or adhesive, forming a ferrule of a multi-fiber connector. Two mating ferrules with the same fiber spacing may then be placed in an abutting relationship so that the ends of the fibers of the respective ferrules are substantially co-axially aligned with one another, thereby forming a multi-fiber connection. If desired, such ferrules can be stacked in order to increase the interconnection density.

Multi-fiber ribbons and connectors have numerous applications in optic communication systems. For instance, some opto-electronic and optical application specific integrated circuits (OASIC) devices, e.g., optical switches, optical power splitters/combiners, routers, etc., have several input and/or output ports arranged as linear arrays to which a plurality of fiber are to be coupled. Further, since optical fibers are attached somehow to launch optical signals into these devices and extract optical signals out of these devices, splicing of arrays of fibers (i.e., a multi-fiber ribbon) to such devices can be achieved using muti-fiber connectors. Yet another possible application relates to an optical fan-out fabric where an array of fibers in a multi-fiber ribbon may be broken into simplex or duplex channels for distribution purposes, as is often desired.

A critical factor to the optical efficiency of a multi-fiber ferrule, whether or not stacked, is the alignment of the mating ferrules with regard to one another. To that end, alignment pins are often utilized. Alignment pins are received in alignment pin holes or slots in the respective ferrules so as to hold the ferrules in precise alignment with regard to one another. The alignment pins usually extend parallel to the optical fibers, and are preferably made of a material have a similar coefficient of thermal expansion to the ferrules. In one embodiment, as disclosed in U.S. Pat. No. 4,973,127 to Cannon Jr. et al., alignment pin holes are formed by grooves that are laterally disposed on opposite sides of the optical fiber V-grooves in the support members, such that when two support members are brought together, alignment pin holes are defined by mating alignment grooves. In U.S. Pat. No. 5,620,634 to the present inventor, wherein support members are stacked in order to increase the interconnection density, alignment slots are provided on each row of optical fiber, that is, every support member interface.

In summary, there continues to exist a need to further miniaturize optical fiber connections and, at the same time, to increase inner connection density while conforming to interface standards.

SUMMARY OF THE INVENTION

The present invention is a stackable multi-fiber ferrule that enables relatively tighter stacking between fiber arrays, resulting in increased interconnection density. The present invention achieves tighter stacking by incorporating an inner support member having alignment pin grooves on only one side. Thus, the thickness of the inner support member may be thinner than that of conventional support members because the inner support member of the present invention does not have to accommodate opposing alignment pin grooves on both sides thereof.

Thus, a multi-fiber stackable ferrule in accordance with the present invention will not have alignment pin holes for every row of fibers but will, instead, have alignment pin holes only on alternating rows of fibers, that is, on every other interface between adjacent support members. However, there is a minimum of two alignment pin holes per stackable ferrule, which is considered the minimum number to maintain alignment and prevent rotation movement of a stackable ferrule with respect to a mating ferrule or device. Accordingly, a stackable multi-fiber ferrule in accordance with the present invention is capable of establishing a highly efficient optical connection.

In accordance with an aspect of the present invention, a stackable multi-fiber ferrule comprises first and second outer support members and at least one inner support member positioned between the outer support members. Each of the outer support members includes a first array of parallel grooves and at least a first alignment pin groove formed in a first surface thereof. In addition, each inner support member includes a second array of parallel grooves formed in a first surface thereof and a third array of parallel grooves formed in a second surface thereof. Each inner support member also includes a second alignment pin groove and a third alignment pin groove. The inner support member is interposed between the first and second outer support members forming at least one interface, and wherein one of the first alignment pin grooves of one of the first and second outer support members and one of the second and third alignment pin grooves of the inner support member form an alignment pin hole at the first interface. The second alignment pin groove may be formed in the first surface and the third alignment pin groove may be formed in the second surface of the inner support member. Alternatively, the second alignment pin groove and the third alignment pin groove may be both formed in the first surface of the inner support member.

The stackable multi-fiber ferrule may further include a second inner support member interposed between the inner support member and one of the first and second outer support members forming a second interface between the second inner support member and the one of the first and second outer support members. The second inner support member may further form a third interface between the inner support member and the second inner support member. The second inner support member may further includes fourth and fifth alignment pin grooves wherein one of the first alignment pin grooves of one of the first and second outer support members and one of the fourth and fifth alignment pin grooves form a second alignment pin hole at the second interface.

The stackable multi-fiber ferrule may further include a plurality of substantially identical inner support members interposed between the first and second outer members, wherein alignment pin holes are defined not at every interface, but at alternating interfaces. Further, the inner support member has a thickness and the second alignment pin groove has a depth, wherein the depth is sufficient with respect to the thickness to prevent the alignment pin grooves from being formed opposite one another.

In accordance with another aspect of the present invention, a stackable multi-fiber ferrule system terminating at least first and second optical fiber ribbons comprises an inner support member including a first array of parallel grooves formed in a first surface thereof and a second array of parallel grooves formed in a second surface thereof. The ferrule system further includes substantially identical first and second outer support members sandwiching the inner support member, wherein each of the first and second outer members includes a third array of parallel grooves formed in a first surface thereof.

The first optical fiber ribbon terminates and is held at a first interface between the first array of parallel grooves and the third array of parallel grooves of the first outer support member. However, the second optical fiber ribbon can be held between the second array of parallel grooves and the third array of parallel grooves of the second outer support member. Further, the inner support member and the first outer support member can include mating alignment pin grooves that form first and second alignment pin holes at the first interface.

The first optic fiber ribbon can include a first end that terminates at the stackable multi-fiber ferrule and a second end that terminates at a second stackable multi-fiber ferrule. The first optical fiber ribbon can also include a plurality of individual optical fibers having respective ends, wherein a first portion of the plurality of optical fibers are terminated at respective ends by a second stackable multi-fiber ferrule and a second portion of the plurality of said optical fibers are terminated at respective ends by a third stackable multi-fiber ferrule.

Other features and advantages of the present invention will become apparent to one skilled in the art upon examination of the following drawings and detailed description. It is intended that all such features and advantages be included herein within the scope of the present invention as defined by the appended claims.

DETAILED DESCRIPTION OF THE INVENTION

Figure 1:
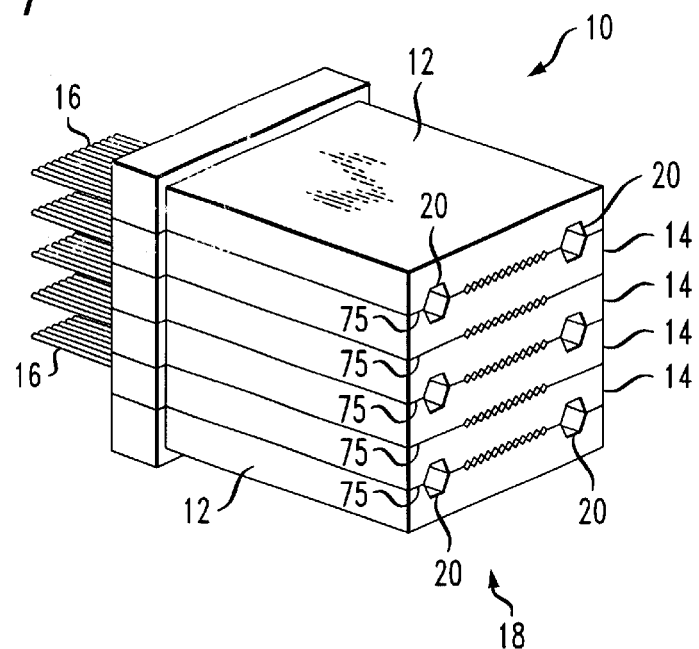
FIG. 1 is a perspective view of a multi-fiber stackable ferrule in accordance with one embodiment of the present invention.

The present invention will now be described more fully hereinafter with reference to the accompanied drawings, which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like reference numeral refer to like elements throughout. Furthermore, the elements of the drawings are not necessarily to scale, emphasis instead being placed upon illustrating the principles of the present invention.

With reference to FIG. 1, a multi-fiber stackable ferrule 10 in accordance with an embodiment of the present invention is illustrated. The ferrule 10 comprises two outer support members 12 that sandwich substantially identical inner support members 14. For purposes of illustrating the present invention, the embodiment chosen terminates five multi-fiber ribbons 16, though upon reading the disclosure herein, it will be apparent to one of ordinary skill in the art that the present invention may be utilized to terminate any number of multi-fiber ribbons 16. The support members 12, 14 include parallel V-grooves which hold the fibers of the respective multi-fiber ribbons 16 in precise, spaced alignment with respect to one another as the V-grooves of adjacent support members are laid over one another in a mating relationship. Thus, the individual fibers of the multifiber ribbons 16 are substantially flush to the front-end face 18 of ferrule 10 so that the fibers may be optically coupled to another ferrule or device.

Figure 5:
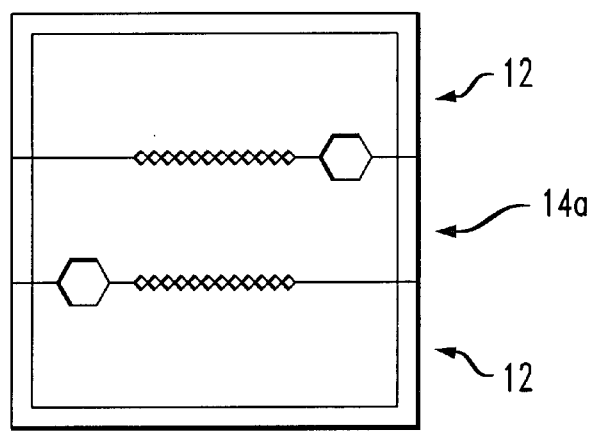
FIG. 5 is a front plan view of an embodiment of a multi-fiber stackable ferrule in accordance with the present invention.

In accordance with one aspect of the present invention, alignment pin holes 20 formed by alignment pin grooves in the support members 12, 14 are provided for on every other row of optical fibers, that is, at alternate interfaces of the respective adjacent support members. In particular, the alignment pin grooves of the inner support members 14 are not opposing one another on opposite sides of the inner support member. In the embodiment illustrated, alignment pin grooves are provided in only one surface, though it will be appreciated by those of ordinary skill in the art that alternative designs may be utilized, such as where the alignment pin grooves are diagonal to one another on opposite surfaces, as illustrated in FIG. 5. Thus, the inner support members 14 do not have to be thick enough to accommodate two opposing alignment pin grooves, and therefore, can be made thinner than conventional inner support members. Accordingly, the overall height or thickness of the ferrule 10 may be advantageously reduced, and the overall interconnection density increased.

Figure 2A:
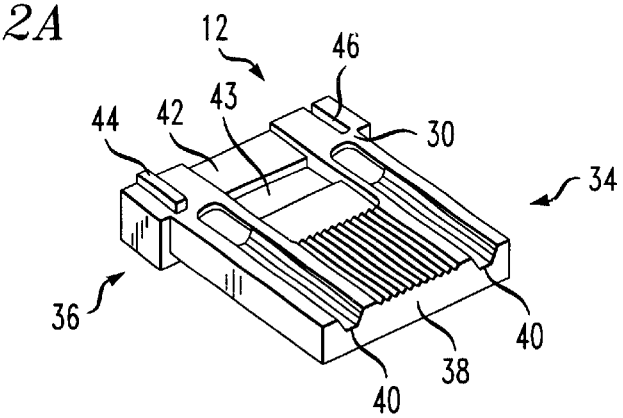
FIG. 2A is a top perspective view of an outer support member in accordance with one embodiment of the present invention.
Figure 2B:
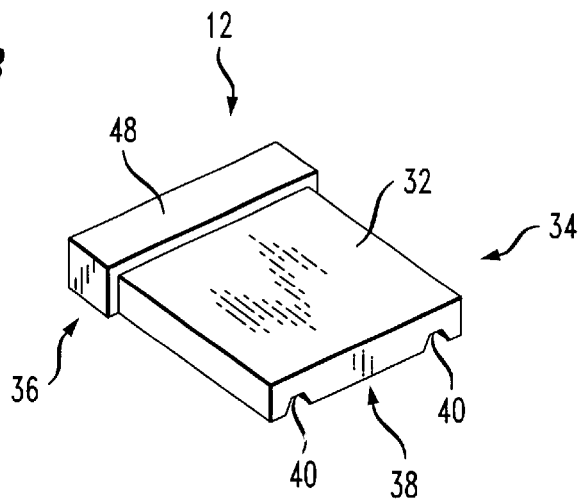
FIG. 2B a bottom perspective view of the outer support member of FIG. 2A.

With reference to FIGS. 2A and 2B, the inside surface 30 and outside surface 32 of the outer support member 12 are illustrated, respectively. The outer support member 12 includes a front portion 34 and a rear portion 36. An array of parallel V-grooves 38 for receiving and holding the optical fibers of the multi-fiber ribbon 16 in precise alignment with respect to one another are provided in the front portion 34 of the inside surface 30. In addition, the inside surface 30 includes relatively deeper V-grooves, referred to hereinafter as alignment pin V-grooves 40, which are laterally disposed on either side of V-grooves 38 and are sized and shaped for holding alignment pins. While the alignment pin V-grooves 40 extend from the front portion 34 toward the rear portion 36, it is recognized that the V-grooves 40 may be sized to extend from the front portion 34 to the rear portion 36, essentially extending from one edge to an opposite edge of inside surface 30. The lateral space between the V-grooves 38, 40 may be defined in accordance with an optical fiber connector interface standard, if desired. Further, while twelve V-grooves 38 are provided by outer support member 12, it will be appreciated by those of ordinary skill in the art that more or fewer than twelve may be utilized without departing from the present invention. For example, it may be desirable to merely have two V-grooves 38 in a duplex system, or up to 32 V-grooves in other systems.

The rear portion 36 includes a ribbon recess 42 which holds a multi-fiber ribbon 16 at or about the point at which the individual optical fibers of the ribbon are separated and stripped. The ribbon recess also provides space for the adhesive utilized to bond adjacent support members together, as discussed below. Further, ribbon recess 42 includes a strain relief element recess 43 for receiving and engaging a lip or other retaining structure at the end of an external strain relief element associated with a multi-fiber ribbon.

A retaining pin 44 and a retaining slot 46 are provided on either side of the cable recess 42 for proximately aligning and holding adjacent support members. The retaining pin 44 and slot 46 provide for the lateral alignment of adjacent support members so that corresponding arrays of V-grooves align with one another. The mating V-grooves can be fabricated with such precision, as discussed hereinafter, that the V-grooves themselves precisely align the individual fibers. This is inherent in the V-shaped design which has an acceptance region at the open end or top of each V-groove for receiving an individual optical fiber which is held in a precise predetermined alignment by the sides of the V-groove. The precise alignment of adjacent support members ensures that the mating V-grooves of adjacent support members are in registration with one another. A ridge 48 at the rear portion 36 is provided to register an end-stop in an housing (not shown) in which such ferrules are utilized, as well known in the art.

Figure 2C:
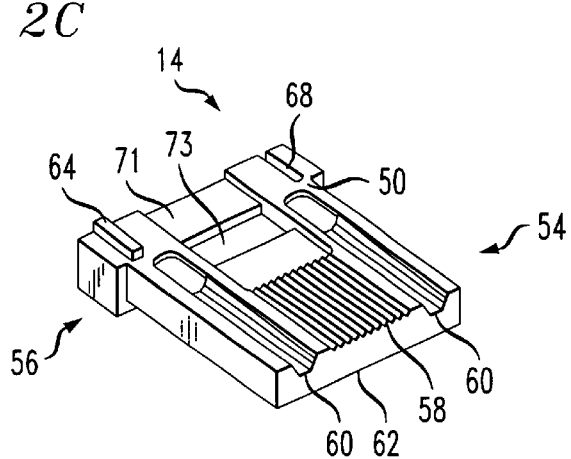
FIG. 2C is a top perspective view of an inner support member in accordance within embodiment of the present invention.
Figure 2D:
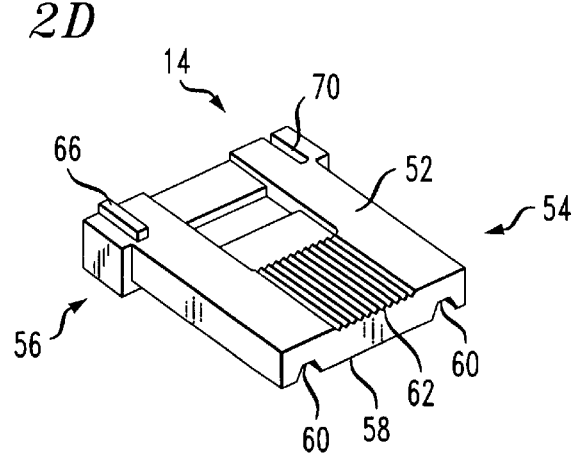
FIG. 2D is a bottom perspective view of the inner support member of FIG. 2C.

With reference to FIGS. 2C and 2D, opposing first and second surfaces 50, 52 of the inner support member 14 are illustrated. The inner support member 12 includes a front portion 54 and a rear portion 56. A first array of parallel V-grooves 58 are provided in a first surface 50 of the front portion 56 for receiving and holding optical fibers of the multi-fiber ribbon 16, and relatively deeper alignment pin grooves 60 laterally disposed on either side of the first array of V-grooves 58. In addition, the second surface 52 of the inner support member 14 includes a second array of parallel V-grooves 62. Thus, the inner support member 14 includes substantially identical and aligned arrays of V-grooves 58, 62 on opposite surfaces for mating with corresponding arrays of V-grooves formed in adjacent support members. In addition, retaining pins 64, 66 and retaining slots 68, 70 are provided on opposing surfaces 50, 52 at the rear portion 58 of the inner support member 14 for aligning and holding adjacent support members, as discussed above with respect to the outer support member 12. Yet further, a ribbon recess 71 and a strain relief element recess 73 are provided in both surfaces 50, 52, as also discussed above with respect to the outer support member 12.

In accordance with the present invention, the inner support member 14 does not include opposing alignment pin grooves in opposite surfaces. Specifically, with reference to the embodiment illustrated in FIGS. 2C and 2D, the second surface 52 does not include alignment pin V-grooves. It is noted, however, that the second surface may include alignment pin grooves which are staggered (i.e., offset) with respect to the corresponding alignment pin grooves 60 in the first surface 50 in the alternative. However, if staggered alignment pin grooves are utilized, then the lateral space on either side of the arrays of V-grooves may have to be increased, which may not be acceptable in certain applications. Thus, whether one surface does not include alignment pin grooves or staggered alignment pin grooves on opposite surfaces, the thickness of the inner support member may be less than that of conventional support members since the support member does not have to be thick enough to accommodate opposing alignment pin grooves. For example, with reference to FIG. 3, the thickness 72 of an inner support member is approximately 740 microns in the preferred embodiment, whereas conventional support members are often 2500 microns thick. Accordingly, by reducing the thickness of the inner support member, more multi-fiber ribbons can be terminated with a ferrule of the same size, thereby enabling the increase of interconnection density.

In addition, it is preferred that the thickness 72 of the inner support members should be such that the distance 74 between the centers of adjacent V-grooves within an array is a whole number multiple of the distance 76 between the center of the V-grooves at one interface and the centers of the V-grooves at an adjacent interface, or vice versa. Accordingly, the thickness 72 is approximately 740 microns and the spacing at the interfaces 75 between adjacent support members is approximately 10 microns, thereby resulting in a distance 76 that is approximately 750 microns, which is a multiple of an illustrative fiber to fiber distance 74 of 250 microns. The approximate distance of 10 microns between adjacent support members is by design so that when two mating support members are placed about a multi-fiber ribbon, the fiber will be under compression. This ensures that fibers with nominal variances in their outside diameters are precisely aligned between mating V-grooves. The controlling V-groove is preferably controlled by an applicable interconnection interface standard. For purposes of this disclosure, the center of a V-groove is the center of an optical fiber held in the V-groove. Thus, greater flexibility with regard to whether the interface planes of a stackable ferrule are parallel or perpendicular to the interfaces of a connecting ferrule.

Figure 3:
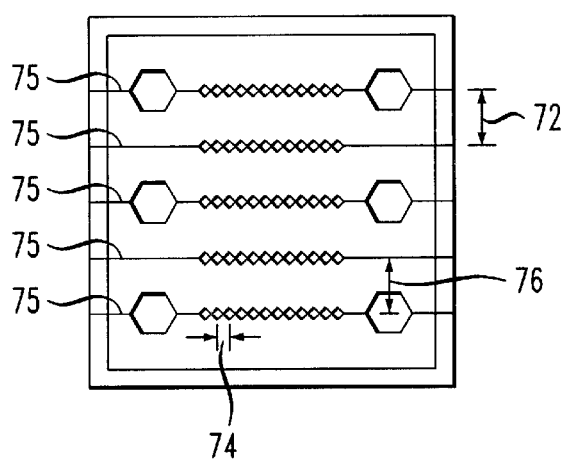
FIG. 3 is a front plan view of the multi-fiber stackable ferrule of FIG. 1.

Thus, by flipping the face-down side of each successive inner support member 14 added to a ferrule stack, the alignment pin holes 20 formed by the alignment pin grooves are positioned at alternating interfaces 75, also referred to as rows of optical fibers, as illustrated in FIGS. 1 and 3. In order to adequately align and secure the ferrule 10 from moving with respect to another ferrule to which it is being optically coupled, there should be at least two alignment pins. While the present invention does not necessarily provide for two alignment holes on every row of optical fibers, it does provide a more than adequate precision and rigidity for most applications, while permitting the overall thickness of the stack of ferrules to be reduced relative to conventional designs.

Accordingly, a ferrule 10 in accordance with the present invention may terminate a theoretically infinite number of multi-fiber ribbons by the present invention utilizing two outer support members 12 and an appropriate number of inner support members 14. As only the two structural components are necessary, the overall costs of a stackable multi-fiber ferrule in accordance with the present invention can be less than that of comparable stackable ferrules that require more than two components. This is, at least in part, because the support members can be fabricated using plastic injection molding techniques with only two molds: one for the outer support member 12 and one for the inner support member 14. This further increases the precision of the V-grooves because adjacent parts will often be formed from the same mold.

In particular, the support members 12, 14 are preferably fabricated using the techniques described in U.S. Pat. Nos. 5,388,174; 5,620,634 and 5,603,870, the disclosures of which are incorporated here by reference as if set forth in full. This process has been proven to consistently and reliably produce features with accuracy on the order of 1 $\mu$m or better. Generally, this process is as follows. Initially, a monocrystalline body, such as a silicon chip, is anisotropically etched using conventional masking and etching techniques to produce V-grooves. For example, either KOH/water or EDP/water solutions may be used as an etchant. The etch rate of the silicon may be several orders of magnitude greater than that of the mask layer such that the unmasked portions are etched away when exposed to the etchant solution, thereby defining the V-grooves along the {111} crystal planes of the silicon. By precisely controlling the mask pattern and the etching process, precise V-grooves of predetermined spacing, widths, and depths may be fabricated in the silicon wafer. It is noted that the V-grooves do not have to be exactly V-shaped. For example, since the optical fibers and alignment pins are essentially round in cross-section, the bottom of the V may be truncated in the same fashion as the alignment pin grooves 40, 60. If truncated, the grooves 40, 60 should be deep enough to provide adequate clearance for an alignment pin. Past that depth, the bottom of the groove is essentially non-functional. However, the depth of the groove may be limited by the necessary structural strength required of the support member, and in particular, the portion of the support member defining the alignment pin groove.

To allow for shrinkage of the plastic during the subsequent molding process, the features on the silicone chip, such as the V-grooves and their spacing, should be made somewhat larger than is finally intended for the final support member. A thin metal layer is then electro-formed over the V-grooves; thereafter, the silicon body is removed or destroyed, as by etching it in, for example, a mixture of HF, $HNO_3$ and water, or KOH and water (or other known etchants of silicon) suitable for use herein. In the preferred embodiment, the metal layer is formed by electroplating nickel over the silicon wafer. Nickel is preferred because it can be conveniently electro-formed with reasonable hardness (e.g., ~50 Rockwell). The electro-formed metal layer forms an inverse replica of the silicon wafer chip which is machined for used as an insert in an injection mold for defining the V-grooves, as well as other features, of the support members 12, 14.

Experiments are then conducted with the injection mold to optimize molding conditions. This involves selection of the most suitable molding compound, molding parameters that produce a smooth surface morphology, and most importantly the degree of mold shrinkage. Such experiments help determine the operation parameters for the optimal output. Preferred material for forming the support members is polyphenylene sulfide (PPS), which has a shrinkage of ~0.4% below the dimensions of the original silicon master. Consequently, the dimensions of the silicon master should be ~0.4% greater than the final desired dimensions. For bonding the support members 12, 14 together, any of various optical adhesives can be used, such as Epo-Tek 353ND, which is commercially available from Epoxy Technologies, Inc., Billerica, Mass.

Figure 4:
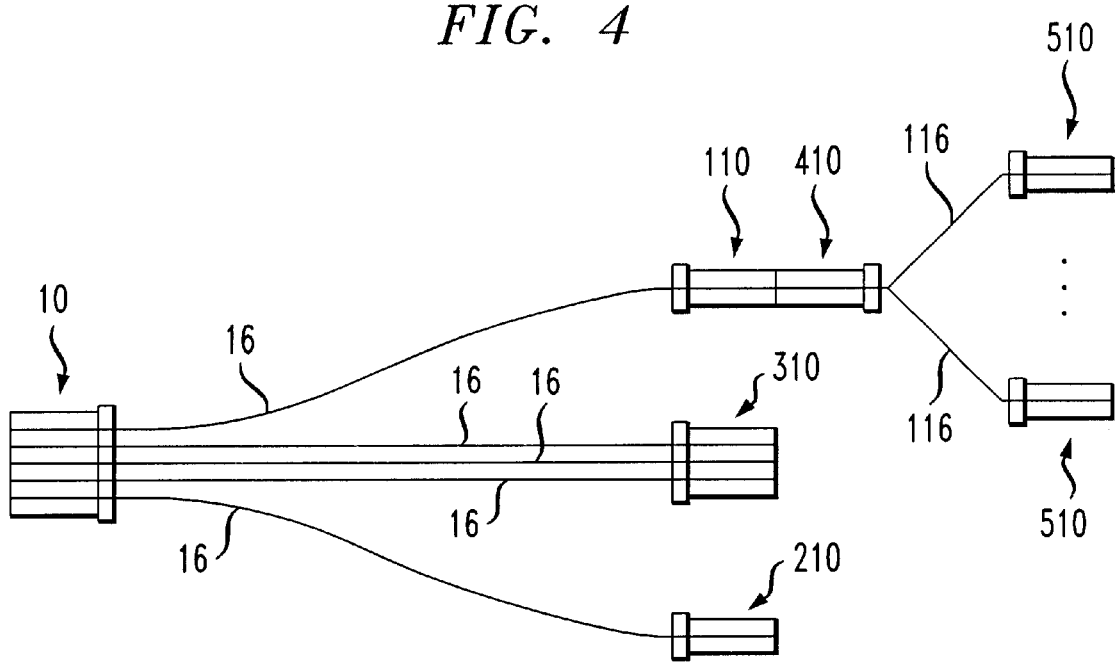
FIG. 4 is a schematic diagram illustrating the fan out of fiber ribbon cables and individual fibers utilizing a stackable multi-fiber ferrule in accordance with an embodiment of the present invention.

With reference to FIG. 4, an exemplary application is provided for a stackable multi-fiber ferrule 10 in accordance with an embodiment of the present invention at a distribution point in which the multi-fiber ribbons 16 terminate at the ferrule 10 and fan-out into two single ribbon ferrules 110, 210 and a three ribbon ferrule 310. The fiber terminations may be coupled to independent optical circuits, to a single broad optical source that illuminates all the fibers, or may be selectively tapped off as in a switch or distribution point. Further, the one ribbon ferrule 110 can be mated to another one ribbon ferrule 410, which may itself terminate one or more individual optical fibers 116. The optical fiber(s) 116 may then fan-out to a plurality of single or multi-fiber ferrules 510. Thus, the optical fiber(s) 116 may be a single optical fiber or multiples thereof. However, this is merely one illustrative embodiment which shows several of the possible fan-out combinations which may be efficiently achieved by a stackable ferrule in with the present invention.

In yet another application, because of the increased connection density and precise fiber alignment of a stackable multi-fiber ferrule assembled in accordance with an embodiment of the present invention, the stackable multi-fiber ferrule may be suitable for mounting at its face-end to an array of precisely aligned surface emitting/receiving devices such as surface emitting lasers (SEL) or other discrete components that can be fabricated with precise spacing on a circuit board or substrate. The optical fibers terminating with the stackable multi-fiber ferrule can be coupled to the surface device whereby a single component is placed in a butting relationship with each optical fiber. Thus, a low profile device connection can be achieved.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A stackable multi-fiber ferrule, comprising:
   first and second outer support members, each said outer support member including a first array of parallel grooves and at least a first alignment pin groove formed in a first surface thereof; and
   an inner support member including a second array of parallel grooves formed in a first surface thereof and a third array of parallel grooves formed in a second surface thereof, wherein said inner support member includes a second alignment pin groove and a third alignment pin groove;
   wherein said inner support member is interposed between said first and second outer support members forming at least one interface, and wherein one of said first alignment pin grooves of one of said first and second outer support members and one of said second and third alignment pin grooves of said inner support member form an alignment pin hole at said first interface; and
   wherein the first and one of the second and third arrays of parallel grooves comprise mating fiber holding grooves.

2. The stackable multi-fiber ferrule of claim 1, further including a second inner support member interposed between said inner support member and one of said first and second outer support members forming a second interface between said second inner support member and said one of said first and second outer support members, and further forming a third interface between said inner support member and said second inner support member, and said second inner support member further including fourth and fifth alignment pin grooves wherein one of said first alignment pin grooves of one of said first and second outer support members and one of said fourth and fifth alignment pin grooves form a second alignment pin hole at said second interface.

3. The stackable multi-fiber ferrule of claim 1, wherein said second array of parallel grooves includes v-grooves that are laterally spaced an equal predetermined distance apart from center to center, and wherein said predetermined distance is a whole number multiple of the distance between said first interface and said second interface.

4. The stackable multi-fiber ferrule of claim 1, wherein said second alignment pin groove is formed in a first surface and said third alignment pin groove is formed in a second surface of said inner support member.

5. The stackable multi-fiber ferrule of claim 1, wherein said second alignment pin groove and a third alignment pin groove are formed in a first surface of said inner support member.

6. The stackable multi-fiber ferrule of claim 1, wherein said first array of parallel grooves of said first outer support member and said second array of parallel grooves of said inner support member register with one another at said first interface.

7. The stackable multi-fiber ferrule of claim 1, further including a plurality of substantially identical inner support members interposed between said first and second outer members, wherein alignment pin grooves holes formed thereby are defined at alternating interfaces.

8. The stackable multi-fiber ferrule of claim 1, wherein each of said first and second outer support members include a retaining notch and a retaining slot on said first surface thereof.

9. The stackable multi-fiber ferrule of claim 1, wherein said inner support member includes a retaining notch and a retaining slot on said first and second surfaces thereof.

10. The stackable multi-fiber ferrule of claim 1, wherein said first and second outer support members are substantially identical.

11. The stackable multi-fiber ferrule of claim 1, wherein said first and second outer support members and said inner support member comprise injection molded plastic.

12. The stackable multi-fiber ferrule of claim 1, wherein said inner support member has a thickness less than approximately 740 microns.

13. The stackable multi-fiber ferrule of claim 1, wherein said second alignment pin grooves are formed in said first surface of said inner support member, wherein said inner support member has a thickness and said second alignment pin groove has a depth, and wherein said depth is sufficient with respect to said thickness to prevent alignment pin grooves from being fabricated in said second surface of said inner support member opposite said second alignment pin grooves.

14. A stackable multi-fiber ferrule system terminating at least first and second optical fiber ribbons, comprising:
   an inner support member including a first array of parallel grooves formed in a first surface thereof and a second array of parallel grooves formed in a second surface thereof; and
   substantially identical first and second outer support members sandwiching said inner support member, each of said first and second outer members including a third array of parallel grooves formed in a first surface thereof, said first optical fiber ribbon terminating and being held between said first array of parallel grooves and said third array of parallel grooves of said first outer support member;
   wherein said inner support member and said first outer support member include mating alignment pin grooves that form an alignment pin hole; and
   wherein said first, second and third array of parallel grooves comprise fiber holding grooves.

15. The stackable multi-fiber ferrule system of claim 14, wherein a second optical fiber ribbon is held between said second array of parallel grooves of said inner support member and said third array of parallel grooves of said second outer support member.

16. The stackable multi-fiber ferrule system of claim 14, wherein said inner support member and said first outer support member include mating alignment pin grooves that form a second alignment pin hole at said first interface.

17. The stackable multi-fiber ferrule system of claim 14, wherein said first optic fiber ribbon includes a first end that terminates at said stackable multi-fiber ferrule system and a second end that terminates at a second stackable multi-fiber ferrule.

18. The stackable multi-fiber ferrule system of claim 14, wherein said first optical fiber ribbon includes a plurality of individual optical fibers having respective ends, wherein a first portion of said plurality of optical fibers are terminated at respective ends by a second stackable multi-fiber ferrule and a second portion of said plurality of said optical fibers are terminated at respective ends by a third stackable multi-fiber ferrule.

19. The stackable multi-fiber ferrule system of claim 14, further including a plurality of inner members interposed between said first and second outer members, wherein said alignment pin grooves holes formed thereby are defined at alternating interfaces.

20. The stackable multi-fiber ferrule system of claim 14, wherein said inner support member includes a first alignment pin groove, and wherein said support member has a thickness and said first alignment pin groove has a depth, and wherein said depth is sufficient with respect to said thickness to prevent a second alignment pin grooves from being fabricated on said second surface of said inner support member opposite said first alignment pin groove.

21. An inner support member of a stackable multi-fiber ferrule comprising:

an inner support member body having first and second opposed surfaces, said inner support member body defining an array of parallel grooves in each of the first and second opposed surfaces;

wherein said inner support member body also defines at least one alignment pin groove opening through the first surface, and wherein the portion of the second surface of said inner support member body that is aligned with the alignment pin groove defined by the first surface is substantially planar and is correspondingly free of alignment pin grooves; and wherein said array of parallel grooves comprises fiber holding grooves.

22. The support member of claim 21, wherein the depth of the alignment pin groove is sufficient with respect to the thickness to prevent a second alignment pin grooves from being fabricated in the second surface of the inner support member opposite the alignment pin groove.

23. The support member of claim 21, wherein the depth of alignment pin groove is more than 50% of the thickness of the inner support member.

24. The support member of claim 21, wherein the thickness of the inner support member body is less than approximately 740 microns.

* * * * *